(12) United States Patent
Smith

(10) Patent No.: US 9,199,653 B2
(45) Date of Patent: *Dec. 1, 2015

(54) COMMUNICATION SYSTEM AND METHOD FOR COMMUNICATING BETWEEN VEHICLES OF A VEHICLE CONSIST

(71) Applicant: General Electric Company, Schenectady, NY (US)

(72) Inventor: Eugene Smith, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/509,198

(22) Filed: Oct. 8, 2014

(65) Prior Publication Data

US 2015/0025717 A1 Jan. 22, 2015

Related U.S. Application Data

(63) Continuation-in-part of application No. 12/903,328, filed on Oct. 13, 2010, now Pat. No. 8,914,167.

(51) Int. Cl.
*G07F 7/00* (2006.01)
*G07F 17/00* (2006.01)
(Continued)

(52) U.S. Cl.
CPC ....... *B61L 15/0027* (2013.01); *H04W 28/0226* (2013.01); *H04W 28/085* (2013.01)

(58) Field of Classification Search
USPC ............. 701/19; 370/328–329; 455/434, 507, 455/509, 512, 515, 180.1, 450; 709/203
See application file for complete search history.

(56) References Cited

U.S. PATENT DOCUMENTS

| 3,706,914 A | 12/1972 | Buren |
|---|---|---|
| 4,283,636 A | 8/1981 | Tchang |

(Continued)

FOREIGN PATENT DOCUMENTS

| EP | 338834 A2 | 10/1989 |
|---|---|---|
| JP | 2012175134 A | 9/2012 |

(Continued)

OTHER PUBLICATIONS

Research of hybrid electric locomotive control strategy; Zhang Xin; Tian Yi; System Science, Engineering Design and Manufacturing Informatization (ICSEM), 2011 International Conference on; vol. 1; Digital Object Identifier: 10.1109/ICSSEM.2011.6081159; Publication Year: 2011 , pp. 118-122.*

(Continued)

*Primary Examiner* — Cuong H Nguyen
(74) *Attorney, Agent, or Firm* — GE Global Patent Operation; John A. Kramer

(57) ABSTRACT

A communication system for a vehicle includes a transceiver assembly, a selection module, and a monitoring module. The transceiver assembly selectively communicates a data signal over a plurality of communication channels. The data signal is related to distributed power operations of the vehicle. The selection module is communicatively coupled with the transceiver assembly and switches the transceiver assembly to any of the communication channels. The monitoring module is communicatively coupled with the selection module and determines a load parameter of one or more of the communication channels. The load parameter is based on a population value of the one or more communication channels. The selection module switches the transceiver assembly to a selected channel of the communication channels based on the load parameter for communicating the data signal over the selected channel.

20 Claims, 6 Drawing Sheets

(51) Int. Cl.
*G05D 1/00* (2006.01)
*G05D 3/00* (2006.01)
*B61L 15/00* (2006.01)
*H04W 28/08* (2009.01)
*H04W 28/02* (2009.01)

(56) References Cited

U.S. PATENT DOCUMENTS

| | | | |
|---|---|---|---|
| 4,456,903 A | 6/1984 | Kishi et al. | |
| 4,760,797 A | 8/1988 | Stubbs et al. | |
| 4,849,651 A | 7/1989 | Estes, Jr. | |
| 4,908,846 A | 3/1990 | Maru | |
| 5,262,932 A | 11/1993 | Stanley et al. | |
| 5,278,996 A | 1/1994 | Shitara | |
| 5,281,859 A | 1/1994 | Crane | |
| 5,613,196 A * | 3/1997 | Barnes et al. | 455/15 |
| 5,681,015 A | 10/1997 | Kull | |
| 5,699,353 A * | 12/1997 | Kent | 370/315 |
| 5,701,121 A * | 12/1997 | Murdoch | 340/10.34 |
| 5,720,455 A | 2/1998 | Kull et al. | |
| 5,738,311 A | 4/1998 | Fernandez | |
| 5,740,547 A | 4/1998 | Kull et al. | |
| 5,785,392 A | 7/1998 | Hart | |
| 5,813,635 A | 9/1998 | Fernandez | |
| 5,815,823 A * | 9/1998 | Engle | 701/19 |
| 5,820,226 A | 10/1998 | Hart | |
| 5,833,325 A | 11/1998 | Hart | |
| 5,927,822 A | 7/1999 | Hart | |
| 5,934,764 A | 8/1999 | Dimsa et al. | |
| 5,950,967 A | 9/1999 | Montgomery | |
| 5,969,643 A | 10/1999 | Curtis | |
| 5,978,718 A | 11/1999 | Kull | |
| 5,986,577 A | 11/1999 | Bezos | |
| 5,986,579 A | 11/1999 | Halvorson | |
| 5,995,881 A | 11/1999 | Kull | |
| 6,114,974 A | 9/2000 | Halvorson | |
| 6,128,558 A | 10/2000 | Kernwein | |
| 6,137,274 A | 10/2000 | Rajagopalan | |
| 6,163,089 A | 12/2000 | Kull | |
| 6,216,095 B1 | 4/2001 | Glista | |
| 6,275,165 B1 | 8/2001 | Bezos | |
| 6,322,025 B1 | 11/2001 | Colbert et al. | |
| 6,360,998 B1 | 3/2002 | Halvorson et al. | |
| 6,377,215 B1 | 4/2002 | Halvorson et al. | |
| 6,396,252 B1 | 5/2002 | Culpepper et al. | |
| 6,782,044 B1 | 8/2004 | Wright et al. | |
| 6,862,502 B2 | 3/2005 | Peltz et al. | |
| 6,898,431 B1 * | 5/2005 | Peele | 455/453 |
| 7,019,506 B2 | 3/2006 | Kernahan | |
| 7,053,593 B2 | 5/2006 | Bemat et al. | |
| 7,092,265 B2 | 8/2006 | Kernahan | |
| 7,103,366 B2 * | 9/2006 | Bates et al. | 455/456.1 |
| 7,304,567 B2 | 12/2007 | Canfield | |
| 7,416,262 B2 | 8/2008 | Ring | |
| 7,466,116 B2 | 12/2008 | Sato et al. | |
| 7,479,757 B2 | 1/2009 | Ahmad | |
| 7,894,223 B2 | 2/2011 | Sato et al. | |
| 8,157,218 B2 | 4/2012 | Riley et al. | |
| 8,428,798 B2 | 4/2013 | Kull | |
| 2004/0049324 A1 | 3/2004 | Walker | |
| 2004/0095103 A1 | 5/2004 | Kernahan | |
| 2004/0217741 A1 | 11/2004 | Muratov et al. | |
| 2004/0249544 A1 * | 12/2004 | Lohberg | 701/70 |
| 2005/0014387 A1 | 1/2005 | Tanaka et al. | |
| 2005/0121971 A1 | 6/2005 | Ring | |
| 2006/0187015 A1 | 8/2006 | Canfield | |
| 2007/0287473 A1 | 12/2007 | Dupray | |
| 2008/0200121 A1 * | 8/2008 | Yamamoto | 455/41.2 |
| 2008/0281477 A1 * | 11/2008 | Hawthorne et al. | 701/19 |
| 2009/0073918 A1 | 3/2009 | Contorto et al. | |
| 2009/0110030 A1 | 4/2009 | Kennedy et al. | |
| 2009/0117899 A1 | 5/2009 | Shiff | |
| 2009/0128237 A1 | 5/2009 | Attwood et al. | |
| 2010/0074160 A1 * | 3/2010 | Mason et al. | 370/315 |
| 2010/0079127 A1 | 4/2010 | Grant | |
| 2010/0142445 A1 | 6/2010 | Schlicht et al. | |
| 2010/0156361 A1 | 6/2010 | Barrenscheen | |
| 2011/0066297 A1 | 3/2011 | Saberi et al. | |
| 2011/0142026 A1 | 6/2011 | Choi | |
| 2011/0249631 A1 * | 10/2011 | Li et al. | 370/329 |
| 2011/0266890 A1 | 11/2011 | Lorenz et al. | |
| 2012/0095626 A1 * | 4/2012 | Smith | 701/19 |

FOREIGN PATENT DOCUMENTS

| | | |
|---|---|---|
| WO | 8301164 A1 | 3/1983 |
| WO | 9960735 A1 | 11/1999 |
| WO | 2007113861 A1 | 10/2007 |
| WO | 2010039680 A1 | 4/2010 |
| ZA | 200101708 A | 8/2001 |

OTHER PUBLICATIONS

Minimizing call setup delay in ATM networks via optimal processing capacity allocation; Cheng-Shong Wu; Jin-Chyang Jiau; Kim-Joan Chen; Choy, M.; Communications Letters, IEEE; vol. 2, Issue: 4; Digital Object Identifier: 10.1109/4234.664221 Publication Year: 1998, pp. 110-112.*

Position-Based Modeling for Wireless Channel on High-Speed Railway under a Viaduct at 2.35 GHz; Liu Liu; Cheng Tao; Jiahui Qiu; Houjin Chen; Li Yu; Weihui Dong; Yao Yuan; Selected Areas in Communications, IEEE Journal on; vol. 30, Issue: 4 Digital Object Identifier: 10.1109/JSAC.2012.120516; Publication Year: 2012, pp. 834-845.*

Distributed autonomous multi-hop vehicle-to-vehicle communications over TV white space; Ihara, Y. et al.; Consumer Communications and Networking Conf. (CCNC), 2013 IEEE; DOI: 10.1109/CCNC.2013.6488467; Pub Year: 2013, pp. 336-344.*

Towards green and secure vehicle-to-vehicle communications: A protocol for establishing the network; Boyaci, A.; Ozturk, E.; Yarkan, S.; Zaim, A.H.; Application of Information and Communication Technologies (AICT), 2013 7th International Conference on Year: 2013; pp. 1-4, DOI: 10.1109/ICAICT.2013.6722720.*

Context-Aware Channel Coordination for DSRC; Zhe Wang; Hassan, M.; GLOBECOM Workshops, 2008 IEEE Year: 2008; pp. 1-6, DOI: 10.1109/GLOCOMW.2008.ECP.61.*

A mobicast routing protocol with carry-and-forward in vehicular ad-hoc networks; Yuh-Shyan Chen; Yun-Wei Lin; Sing-Ling Lee Communications and Networking in China (CHINACOM), 2010 5th International ICST Conference on; Year: 2010; pp. 1-5.*

A new frequency channel assignment algorithm in high capacity mobile communication systems; Elnoubi, S.M.; Singh, R.; Gupta, S.C.; Vehicular Technology, IEEE Transactions on; Year: 1982, vol. 31, Issue: 3; pp. 125-131, DOI: 10.1109/T-VT.1982.23924.*

Knowledge-based dynamic channel selection in vehicular networks (Poster); Rocke, S.; Si Chen; Vuyyuru, R.; Altintas, O.; Wyglinski, A.M.; Vehicular Networking Conference (VNC), 2012 IEEE; DOI: 10.1109/VNC.2012.6407426; Publication Year: 2012, pp. 165-172.

Analysis and experimental verification of faulty network modes in an autonomous vehicle string; Rodonyi, G. et al; Control & Automation (MED), 2012; 20th Mediterranean Conf. on; DOI: 10.1109/MED.2012.6265750; Pub Year: 2012, pp. 884-889.

Distributed autonomous multi-hop vehicle-to-vehicle communications over TV white space; Ihara, Y. et al.; Consumer Communications and Networking Conf. (CCNC), 2013 IEEE; DOI: 10.1109/CCNC.2013.6488467; Pub Year: 2013, pp. 336-344.

A 12 b 28-channel trimless DAC; Imamura, M.; Solid-State Circuits Conference, 1997. Digest of Technical Papers. 43rd ISSCC., 1997 IEEE International; Digital Object Identifier: 10.1109/ISSCC.1997.585451; Publication Year: 1997, pp. 984-385, 490.

Research of hybrid electric locomotive control strategy; Zhang Xin; Tian Yi; System Science, Engineering Design and Manufacturing Informatization (ICSEM), 2011 International Conference on; vol. 1; Digital Object Identifier: 10.1109/ICSSEM.2011.6081159; Publication Year: 2011, pp. 118-122.

Minimizing call setup delay in ATM networks via optimal processing capacity allocation; Cheng-Shong Wu; Jin-Chyang Jiau; Kim-Joan

(56) References Cited

OTHER PUBLICATIONS

Chen; Shoy, M.; Communications Letters, IEEE; vol. 2, Issue: 4; Digital Object Identifier: 10.1109/4234.664221; Publication Year: 1998, pp. 110-112.

Research on power electric switch system used in the auto-passing neutral section with electric load; Wang Ran; Zheng, T.Q.; Xiong Li; Bing Liu; Electrical Machines and Systems (ICEMS), 2011 International Conference on; Digital Object Identifier: 10.1109/ICEMS. 2011.6073775; Publication Year: 2011, pp. 1-4.

The modern state and perspectives for development of MITRIS system; Naritnic, T.N.; Voltenko, A.G.; Iichenko, M.E.; Lipatov, A.F.; Olenik, V.F.; Microwave Conference, 2000. Microwave and Telecommunication Technology. 2000 10th International Crimean; Digital Object Identifier: 10.1109/CRMICO.2000.1255862; Publication Year: 2000, pp. 100-102.

Position-Based Modeling for Wireless Channel on High-Speed Railway under a Viaduct at 2.35 GHz; Liu Liu; Cheng Tao; Jiahui Qiu; Houjin Chen; Li Yu; Weihui Dong; Yao Yuan; Selected Areas in Communications, IEEE Journal on; vol. 30, Issue: 4; Digital Object Identifier: 10.1109/JSAC.2012.120516; Publication Year: 2012, pp. 834-845.

Filtered multitone modulation for very high-speed digital subscriber lines; Cherubini, G.; Eleftheriou, E.; Olcer, S.; Selected Areas in Communications, IEEE Journal on; vol. 20, Issue: 5; Digital Object Identifier: 10.1109/JSAC.2002.1007382; Publication Year: 2002, pp. 1016-1028.

\* cited by examiner

COMMUNICATION SYSTEM AND METHOD FOR COMMUNICATING BETWEEN VEHICLES OF A VEHICLE CONSIST

CROSS-REFERENCE TO RELATED APPLICATIONS

This application is a continuation-in-part of U.S. patent application Ser. No. 12/903,328, which was filed on 13 Oct. 2010, and the entire disclosure of which is incorporated herein by reference.

BACKGROUND

One or more embodiments of the subject matter described herein relate to data communications and, more particularly, to data communications with a rail vehicle.

Rail vehicles such as distributed power trains include a lead powered unit, such as a locomotive, (lead unit) and one or more remote powered units, such as other locomotives, (remote units), dispersed through out the train. These powered units supply the tractive effort to propel the train along a track. For distributed power operations, the lead and remote locomotives may communicate with each other to coordinate the tractive efforts and/or braking efforts provided by each locomotive. For example, a lead or first locomotive may communicate with a remote or second locomotive of the same train in order to control or otherwise direct how much tractive effort the second locomotive is to provide based on the terrain, the grade of the track, emission restrictions, amounts of cargo being transported by the train, and the like.

Some known powered units in distributed power trains wirelessly communicate with each other. For example, lead and trailing locomotives in distributed power trains can wirelessly communicate data signals with each other. The powered units may be assigned a communication channel over which data signals are communicated. The communication channel may be defined as a frequency or band of frequencies used to wirelessly communicate the data signals.

The channels may be assigned to the distributed power trains based on a unit identification or serial number (S/N) of one or more of the powered units of the distributed power train. For example, the distributed power train having a locomotive with a unit identification or serial number (S/N) ending with "1" are assigned a first channel, the distributed power train having a locomotive with a unit identification or serial number (S/N) ending with "2" are assigned a different second channel, and so on. The amount of available channels for assignment among the powered units may be limited by statutory and/or regulatory restrictions.

In geographic areas that are densely populated with many distributed power trains, several distributed power trains each having multiple powered units may be assigned to the same channel. As more distributed power trains are assigned to a common channel, the communication of data signals between the powered units of each distributed power trains may be significantly delayed. As a result, an instruction to change a tractive effort that is sent by the lead powered unit to the remote power units in the same distributed power trains may not be delivered in time in order to coordinate the tractive efforts provided by the powered units.

A need exists for an improved system and method for communicating within and/or among rail vehicles.

BRIEF DESCRIPTION

In one embodiment, a communication system for a rail vehicle is provided. The communication system includes a transceiver assembly, a selection module, and a monitoring module. The transceiver assembly selectively communicates a data signal over a plurality of communication channels. The data signal is related to distributed power operations of the rail vehicle. The selection module is communicatively coupled with the transceiver assembly and switches the transceiver assembly to any of the communication channels (the selection module can switch the transceiver to any of the channels). The monitoring module is communicatively coupled with the selection module and determines a load parameter of one or more of the communication channels. The load parameter is based on a population value of the one or more communication channels. The selection module switches the transceiver assembly to a selected channel of the communication channels based on the load parameter for communicating the data signal over the selected channel.

In another embodiment, a method for communicating with a rail vehicle is provided. The method includes monitoring a population value of one or more communication channels used by a transceiver assembly of the rail vehicle to communicate a data signal and determining a load parameter of the one or more communication channels based on the population value. The data signal is related to distributed power operations of the rail vehicle. The method also includes switching the transceiver assembly to a selected channel of the communication channels based on the load parameter.

In another embodiment, a non-transitory computer readable storage medium for a rail vehicle having a transceiver assembly, a selection module, and a monitoring module is provided. The computer readable storage medium includes instructions to direct the monitoring module to determine a load parameter of one or more communication channels over which the transceiver assembly communicates a data signal. The data signal is related to distributed power operations of the rail vehicle. The load parameter is based on a population value of the one or more communication channels. The instructions also direct the selection module to switch the transceiver assembly to a selected channel of the communication channels based on the load parameter.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
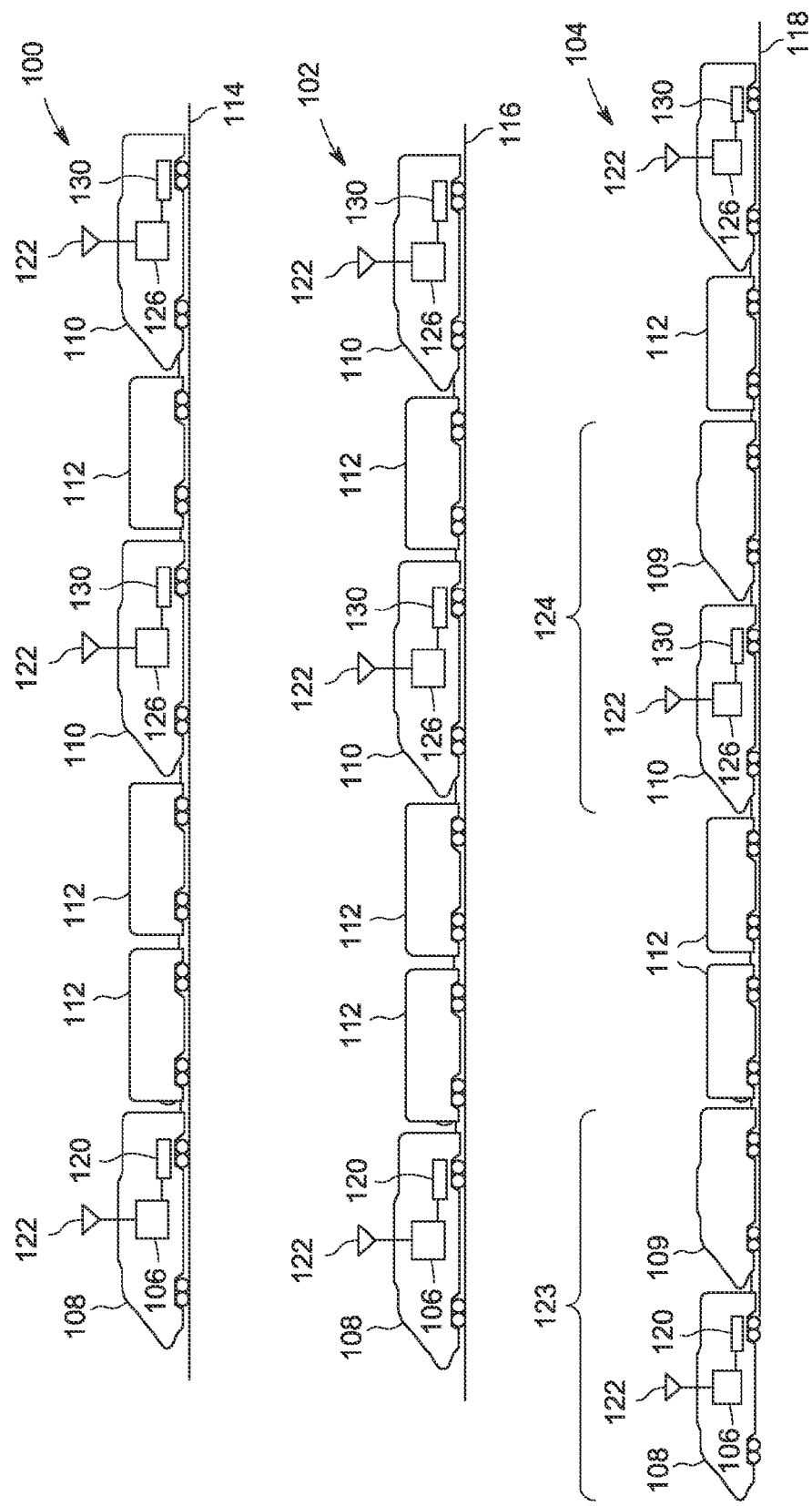
FIG. 1 is a schematic illustration of rail vehicles that include communication systems in accordance with one embodiment.

FIG. 1 is a schematic illustration of vehicle consists 100, 102, 104 that include communication systems 106, 126 in accordance with one embodiment. The vehicle consists 100, 102, 104 optionally can be referred to as distributed power trains, but not all embodiments described herein are limited to rail vehicles or trains. While the description herein focuses on rail vehicles and trains, alternatively, one or more embodiments also may apply to other types of vehicles, such as marine vessels, mining vehicles, other types of off-highway vehicles (e.g., vehicles that are not designed and/or legally permitted to travel on public roadways), automobiles, airplanes, or the like. The vehicle consists 100, 102, 104 include powered (e.g., propulsion-generating) units that are distributed throughout the consists in the illustrated embodiment. In the illustrated embodiment, the powered units are locomotives. Alternatively, the powered units may include one or more other vehicles capable of self-propulsion. As shown in FIG. 1, the vehicles 100, 102, 104 include lead units 108 coupled with several remote and/or trailing units 109, 110 and non-powered units or cars 112 (e.g., vehicles that are not capable of self-propulsion). The trailing and remote powered units may be referred to as "remote powered units." The lead and remote powered units 108, 109, 110 provide tractive forces to propel the rail vehicles 100, 102, 104 along tracks 114, 116, 118. The lead and remote powered units 108, 109, 110 include propulsion subsystems 120, 130 that provide tractive effort and/or braking effort to propel and stop movement of the rail vehicles 100, 102, 104, respectively. For example, the propulsion subsystems 120, 130 may include traction motors, air brakes, dynamic brakes, and the like.

In one embodiment, the lead powered units 108 are leading locomotives disposed at the front end of the rail vehicles 100, 102, 104 and the remote or trailing powered units 109, 110 are remote locomotives disposed behind the lead powered units 108 between the lead powered units 108 and the back ends of the rail vehicles 100, 102, 104. The individual cars 112 may be storage units for carrying goods and/or passengers along the tracks 114, 116, 118.

The remote powered units 109, 110 are remote from the lead powered units 108 in that the remote powered units 109, 110 are not located within the lead powered unit 108. A remote powered unit 109, 110 need not be separated from the lead powered unit 108 by a significant distance in order for the remote powered unit 109, 110 to be remote from the lead powered unit 108. For example, the remote powered unit 109, 110 may be directly adjacent to and coupled with the lead powered unit 108 and still be remote from the lead powered unit 108. The number of lead and remote powered units 108, 109, 110 in the rail vehicles 100, 102, 104 may vary from those shown in FIG. 1.

The lead powered unit 108 or the remote powered units 109, 110 may be organized into consist groups or vehicle consists. A vehicle consist or consist group includes one or more vehicles mechanically or logically coupled with each other to travel together along a route. The consist group of powered units 108, 109, and/or 110 may operate together in unison as a single power unit. For example, multiple powered units 108, 109, 110 may correlate the tractive and/or braking efforts provided by each powered unit 108, 109, 110 in the consist group based on or related to each other. In the illustrated embodiment, the lead powered unit 108 is organized into consist group 123, which may include the lead powered unit 108 and one or more remote powered units 109 that are the same or similar models and/or are the same or similar type of power unit. The remote powered unit 110 is organized into consist group 124, which may include the remote powered unit 110 and one or more trail powered units 109 that are the same or similar models and/or are the same or similar type of power unit. For example, the consist group 123 or 124 may include lead and/or remote powered units 108, 110 and trail powered units 109 that are manufactured by the same entity, supply the same or similar tractive force, have the same or similar braking capacity, have the same or similar types of brakes, and the like. With respect to mechanical coupling, the lead and/or remote powered units 108, 110 and the trail powered units 109 in a consist group 123 or 124 may be directly coupled with one another or may be separated from one another but interconnected by one or more other components or units. With respect to logical coupling, the powered units in a vehicle consist may be separated from each other and not coupled with each other, but may communicate with each other so that the movements of the vehicles are coordinated with each other.

The lead and remote powered units 108, 109, 110 in each rail vehicle 100, 102, 104 may communicate with the other lead and/or remote powered units 108, 109, 110 in the same rail vehicle 100, 102, 104 in order to coordinate the movement of the associated rail vehicle 100, 102, 104. For example, the lead and remote powered units 108, 109, 110 in the rail vehicles 100, 102, 104 may include the communication systems 106, 126 to communicate data signals between the lead and remote powered units 108, 109, 110 in the same rail vehicle 100, 102, 104. In the illustrated embodiment, the communication systems 106, 126 include antennas 122 capable of wirelessly communicating data signals between the lead and remote powered units 108, 109, 110 in the same rail vehicle 100, 102, 104. Alternatively, the communication systems 106, 126 may communicate data signals between lead and/or remote powered units 108, 109, 110 in different rail vehicles 100, 102, 104. The wireless communication may include radio frequency (RF) communications.

The data signals communicated among the powered units 108, 109, 110 of the rail vehicles 100, 102, 104 are related to distributed power operations of the rail vehicles 108, 109, 110 in one embodiment. For example, the lead and remote powered units 108, 109, 110 within a rail vehicle 100, 102, or 104 transmit the data signals among one other to communicate instructions used to control operation of the propulsion subsystems 120, 130 of the lead and/or remote powered units 108, 109, 110 of the same rail vehicle 100, 102, 104. The data signals are used to change the speed, braking, and the like, of the powered units 108, 109, 110. For example, the lead powered unit 108 may transmit a data signal that instructs the remote powered units 109, 110 to change a tractive and/or braking effort provided by the propulsion subsystem 120, 130 in the remote powered units 109, 110. The remote powered units 109, 110 may transmit data signals to the lead powered unit 108 to report on a status or state of the propulsion subsystems 120, 130 in the remote powered units 109, 110 and/or direct the lead powered unit 108 to change a tractive and/or braking effort supplied by the propulsion subsystem 120, 130 of the lead powered unit 108.

The communication systems 106 and/or 126 may communicate data signals among each other over communication channels. A communication channel may be associated with a signal parameter, such as a frequency or range of frequencies at which a signal is communicated on the channel. For example, the communication systems 106, 126 may use a Frequency Division Multiple Access (FDMA) method to communicate data signals over or using different channels. In such a method, a first communication channel may include a first frequency or range of frequencies and a different second communication channel may include a different second frequency or different range of frequencies. The communication systems 106, 126 in different units 108, 109, 110 communicate with each other over a communication channel by transmitting data signals at the frequency of the communication channel or at a frequency that is within the range of frequencies of the communication channel. The communication system 106, 126 receives the data signal over the communication channel by listening for the data signal at the frequency or within the frequencies of the communication channel. Different communication channels may have different frequencies and/or different, non-overlapping ranges of frequencies. Alternatively, different communication channels may be associated with other signal parameters, such as different amplitudes of communicated signals, or with different methods of allocating channels, such as a Time Division Multiple Access (TDMA) method of allocating channels or a Code Division Multiple Access (CDMA) method of allocating channels. Optionally, a communication channel may be defined as a type of communication used to communicate the data signals. For example, one communication channel may use a radio to wirelessly communicate the data signals while another, different communication channel may use cellular telephones, satellites, or the like, for wirelessly communicating the data signals.

One or more of the communication systems 106, 126 may monitor two or more communication channels to determine if the communication system 106, 126 should switch channels. For example, if a communication channel currently being used by the communication system 106 of the rail vehicle 100 to transmit and/or receive data signals (an "operational channel") is being used by many other communication systems 106, 126 of other nearby rail vehicles 102, 104, then the communication system 106 of the rail vehicle 100 may switch to another channel to transmit and/or receive the data signals (a "selected channel"). The communication systems 106, 126 may monitor and switch between different available channels so that the communication systems 106, 126 are avoiding using heavily used, or "populated," channels. If many communication systems 106, 126 in a particular geographic area are using a first communication channel while very few or no other communication systems 106, 126 are using a second communication channel (for example, a "sparsely populated" channel), one or more of the communication systems 106, 126 may switch to using the second communication channel.

Figure 2:
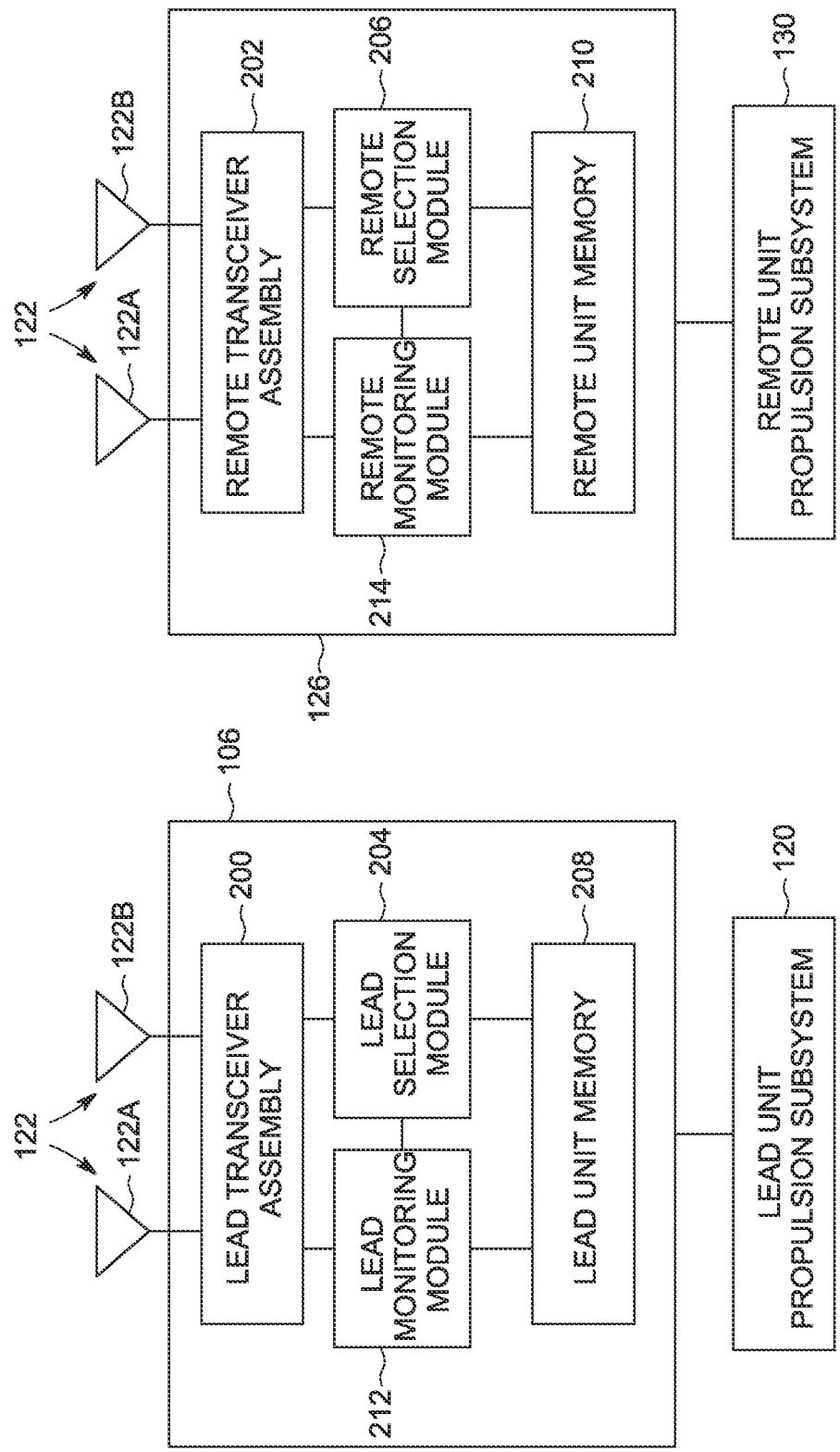
FIG. 2 is a schematic diagram of the communication systems shown in FIG. 1 in accordance with one embodiment.

FIG. 2 is a schematic diagram of the communication systems 106, 126 in accordance with one embodiment. The communication system 106 may be referred to as the lead communication system 106 as the communication system 106 is disposed in the lead powered unit 108 in the embodiment shown in FIG. 1. The communication system 126 may be referred to as the remote communication system 126 as the communication system 126 is disposed in one or more of the remote powered units 109, 110 in FIG. 1.

The lead and remote communication systems 106, 126 include lead and remote transceiver assemblies 200, 202, respectively. The transceiver assemblies 200, 202 are devices capable of transmitting and/or receiving wireless data signals between each other over a plurality of communication channels in one embodiment. The transceiver assemblies 200, 202 may include one or more RF radios coupled with one or more of the antennas 122. The number of antennas 122 shown in FIG. 2 is provided merely as an example. The number of antennas 122 coupled with each transceiver assembly 200, 202 may be different from the embodiment shown in FIG. 2. The transceiver assemblies 200, 202 may include separate or common transmit and receive circuitry. For example, one or more of the transceiver assemblies 200, 202 may include transmit circuits that are separate from receive circuits, or transmit circuits that share one or more conductive pathways with the receive circuits.

As described above, the communication systems 106, 126 are communicatively coupled with the propulsion subsystems 120, 130 of the lead and remote powered units 108, 109, 110 (shown in FIG. 1) (Lead Unit Propulsion Subsystem 120 and Remote Unit Propulsion Subsystem 130, respectively). The lead transceiver assembly 200 receives data signals containing instructions from the propulsion subsystems 120 and communicates the instructions to the remote transceiver assembly 202, which then transmits data signals containing instructions for propulsion subsystems 130 to control the tractive and/or braking efforts provided by the propulsion subsystems 130.

The lead and remote communication systems 106, 126 include lead and remote selection modules 204, 206, respectively, and lead and remote monitoring modules 212, 214, respectively. The selection and/or monitoring modules 204, 206, 212, 214 may include one or more processors, microprocessors, controllers, microcontrollers, or other logic based devices that operate based on instructions stored on a tangible and non-transitory computer readable storage medium. For example, the selection and/or monitoring modules 204, 206, 212, 214 may be embodied in one or more processors that operate based on hardwired instructions or software applications stored on a lead or remote unit memory 208, 210, respectively. The memories 208, 210 may be or include electrically erasable programmable read only memory (EEPROM), simple read only memory (ROM), programmable read only memory (PROM), erasable programmable read only memory (EPROM), FLASH memory, a hard drive, or other type of computer memory.

The selection modules 204, 206 are communicatively coupled with the associated transceiver assemblies 200, 202 by one or more wired or wireless connections. The selection modules 204, 206 switch the channels that the transceiver assemblies 200, 202 communicate data signals over. For example, the lead selection module 204 controls which channel the lead transceiver assembly 200 uses to transmit control signals to the remote transceiver assembly 202 and the remote selection module 206 controls which channel the remote transceiver assembly 202 uses to receive the data signals.

The monitoring modules 212, 214 are communicatively coupled with the associated selection modules 204, 206 and the associated transceiver assemblies 200, 202 by one or more wired or wireless connections. The monitoring modules 212, 214 determine load parameters for communication channels that may be used by the transceiver assemblies 200, 202 to communicate data signals. In one embodiment, the load parameters represent values or measurement associated with how populated or busy the various channels are. For example, the monitoring modules 212, 214 may calculate population values for the channels and the load parameters for the channels may be at least partially based on the population values. The population value for a channel represents how many rail vehicles 100, 102, 104 (shown in FIG. 1) and/or communication systems 106, 126 are using the channel to communicate data signals. The population value that is measured by the monitoring module 212 or 214 may be a number of the rail vehicles 100, 102, 104 and/or communication systems 106, 126 other than the rail vehicle 100, 102, 104 or communication system 106, 126 that includes the monitoring module 212 or 214. For example, the population value may be based on how many other transceiver assemblies 200, 202 are using a channel.

Table 1 below illustrates how the population values for several channels may be calculated by the monitoring modules 212, 214 in one embodiment. In Table 1, the first row includes listings of the channels that are available to the transceiver assemblies 200, 202, which includes Channel 1, Channel 2, Channel 3, and Channel 4. The second through fourth rows include listings of different trains, or rail vehicles 100, 102, 104 (shown in FIG. 1) arranged in different columns, with each column associated with a different channel. For example, the communication systems 106, 126 of the rail vehicles 100, 102, 104 listed in the first column (the "Channel 1" column) are using Channel 1 to communicate. The communication systems 106, 126 of the rail vehicles 100, 102, 104 listed in the second through fourth columns (the "Channel 2," "Channel 3," and "Channel 4" columns, respectively) are using the associated channels to communicate. The rail vehicles 100, 102, 104 are listed as "Train A," "Train B," "Train C," and the like. In the illustrated embodiment, serial number (S/N) of the lead powered unit 108 (shown in FIG. 1) of the rail vehicle 100, 102, 104 is listed to identify the rail vehicle 100, 102, 104. The serial numbers (S/N) of the lead powered units 108 may be unique so that few or no other lead powered units 108 have the same serial numbers (S/N).

TABLE 1

| Channel 1 | Channel 2 | Channel 3 | Channel 4 |
|---|---|---|---|
| Train A; S/N 1234 | Train D; S/N 4567 | | Train F; S/N 6789 |
| Train B; S/N 2345 | Train E; S/N 5678 | | |
| Train C; S/N 3456 | | | |

As shown in Table 1, three rail vehicles 100, 102, 104 ("Train A," "Train B," and "Train C") are using Channel 1 to communicate, two rail vehicles 100, 102, 104 ("Train D" and "Train E") are using Channel 2, no rail vehicles 100, 102, 104 are using Channel 3, and only one rail vehicle 100, 102, or 104 ("Train F") is using Channel 4. The monitoring modules 212, 214 may calculate the population values for Channels 1 through 4 based on the number of rail vehicles 100, 102, 104 using the channels. For example, Channel 1 may have a population value of three, Channel 2 may have a population value of two, Channel 3 may have a population value of zero, and Channel 4 may have a population value of one. Alternatively, the population values may be based on the number of communication systems 106, 126 using the channels. For example, instead of counting the number of rail vehicles 100, 102, 104 (shown in FIG. 1) using each channel, the monitoring modules 212, 214 may determine the number of communication systems 106, 126 among the rail vehicles 100, 102, 104 that are using the channels.

The monitoring modules 212, 214 can generate a table or database that is similar to or includes similar information as Table 1 in order to monitor the population values of the different channels. The table or database generated by the monitoring modules 212, 214 may be stored in the memory 208 or 210, respectively. Each monitoring module 212, 214 may generate and manage a separate table of the population values and/or the serial numbers (S/N) of the rail vehicles 100, 102, 104 using the different channels. In one embodiment, one or more of the communication systems 106, 126 transmit the serial number (S/N) or other unique identification of the lead and/or remote powered units 108, 109, 110 (shown in FIG. 1) with data signals that are communicated over a channel. The monitoring modules 212, 214 may record the serial numbers (S/N) to determine the population values of the channel. For example, the monitoring modules 212, 214 may record the serial numbers (S/N) of the lead powered units 108 of the rail vehicles 100, 102, 104 (shown in FIG. 1) that have communication systems 106, 126 transmitting over a channel to determine the population value for that channel.

The monitoring modules 212, 214 dynamically update the population values of the channels in one embodiment. For example, the monitoring modules 212, 214 may repeatedly determine the population values for the channels and update the population values when one or more rail vehicles 100, 102, 104 (shown in FIG. 1) switch channels, stop communicating over a channel, and/or begin communicating over a channel. The monitoring modules 212, 214 can dynamically update the population values in that the monitoring modules 212, 214 can update the population values while the transceiver assembly 200, 202 is communicating data signals to control the propulsion subsystems 120, 130.

For example, the transceiver assemblies 200, 202 can each include multiple radios or multiple antennas 122. In FIG. 2, the antennas 122 for each transceiver assembly 200, 202 are labeled 122A, 122B. The antennas 122A transmit and/or receive data signals used to control operations of the propulsion subsystems 120, 130. The other antennas 122B scan or listen to one or more other channels to determine which rail vehicles 100, 102, 104 are using the channels. For example, the antennas 122A may cycle through the different Channels 1, 2, 3, and 4 to identify the serial numbers (S/N) of the rail vehicles 100, 102, 104 that are transmitting on each Channel 1, 2, 3, and 4 while the antennas 122B continue to transmit and receive data signals to control the propulsion subsystem 120, 130.

As described above, load parameters are determined for the different channels. The monitoring or selection modules 212, 214, 204, 206 may determine the load parameters. The load parameter for each channel may be based on the population value of the channel. For example, the load parameter for Channel 1 may be larger than the load parameters for Channels 3 and 4 because the population value for Channel 1 is larger than the population values for Channels 3 and 4. In another embodiment, the load parameter may be based on another channel index in addition to or in place of the population value.

By way of example only, the load parameter for a channel may be based on a Quality of Service (QoS) index of the channel. The QoS index may be a measurement of the ability of the channel to transmit data signals at a predetermined transmission rate, data flow, throughput, or bandwidth. For example, the QoS index may be a comparison of the actual transmission rate of a channel with a predetermined threshold transmission rate of the channel. Alternatively, the QoS index may be a measurement of dropped packets of data signals that are transmitted through the channel, a delay or latency of the data signals, jitter or delays among the data packets in a data signal, an order of delivery of the various data packets in the data signal, and/or an error in transmitting one or more of the data packets.

The load parameters for several channels are calculated by the monitoring modules 212, 214 and communicated to the selection modules 204, 206 based on the population values obtained by the monitoring modules 212, 214. Alternatively, the load parameters are calculated by the selection modules 204, 206 based on the population values obtained by the monitoring modules 212, 214. The selection modules 204, 206 use the load parameters in order to determine which of the channels should be used to communicate data. In one embodiment, the selection modules 204, 206 use the load parameters to select a sparsely populated channel, such as the channel having a smaller or the smallest population value.

The channel that is chosen by the selection modules 204, 206 is referred to as a selected channel. The selection modules 204, 206 may then direct the transceiver assemblies 200, 202 to switch to or continue using the selected channel. For example, if the transceiver assemblies 200, 202 are using an operating channel that is different from a selected channel, then the selection modules 204, 206 may switch the transceiver assemblies 200, 202 to the selected channel. If the transceiver assemblies 200, 202 already are using the selected channel as the operational channel of the transceiver assembly 200 or 202, then the selection modules 204, 206 may not direct the transceiver assemblies 200, 202 to change channels.

With respect to the example embodiment described in connection with Table 1 above, a rail vehicle that currently not communicating over any of the Channels 1, 2, 3, or 4 (such as a rail vehicle having a communication system that was recently activated or turned on) may have a communication system 106, 126 that selects Channel 3 as the selected channel. The transceiver assemblies 200, 202 of the rail vehicle may then switch to Channel 3 to communicate data signals between lead and remote powered units 108, 109, 110 of the rail vehicle. The communication systems 106, 126 of the rail vehicle and other rail vehicles 100, 102, 104 may update the tables or databases that include listings of which rail vehicles are communicating on which channels. For example, Table 2 below shows an updated distribution of the rail vehicles among the channels, with the rail vehicle "New Train" listed under Channel 3:

TABLE 2

| Channel 1 | Channel 2 | Channel 3 | Channel 4 |
|---|---|---|---|
| Train A; S/N 1234 | Train D; S/N 4567 | New Train; S/N 7891 | Train F; S/N 6789 |
| Train B; S/N 2345 | Train E; S/N 5678 | | |
| Train C; S/N 3456 | | | |

The rail vehicles may repeatedly update the table or listings that reflect the distribution of the rail vehicles among the different available channels. For example, the communication systems 106, 126 may periodically update the tables on a relatively frequent basis, such as once every few seconds, minutes, or hours. The communication systems 106, 126 may switch between channels based on changing distributions of the rail vehicles among the channels in order to reduce the number of densely populated channels. For example, one or more of Train A, Train B, or Train C may switch to Channel 3 or 4 based on the distribution of Table 2 above.

In the event that the communication systems 106, 126 of two or more rail vehicles 100, 102, 104 decide to switch over to the same channel, one or more priority criteria may be used to determine which of the rail vehicles 100, 102, 104 are permitted to switch to the same channel. With respect to distribution of rail vehicles using the Channels 1, 2, 3, and 4 shown above in Table 1, the communication systems 106, 126 of several rail vehicles may decide to switch to Channel 3. For example, one or more the communication systems 106, 126 of the rail vehicles using Channel 1 (Train A, Train B, and Train C) and/or the New Train may decide to switch their respective transceiver assemblies 200, 202 to Channel 3 at the same time or approximately the same time. In order to prevent too many communication systems 106, 126 from transferring to a common channel, the communication systems 106, 126 may switch to selected channels only if a priority index of the associated rail vehicles is sufficiently high.

The priority index may be a number or measurement of a priority of a rail vehicle 100, 102, 104 in changing between different channels. In one embodiment, the priority index of the communication systems 106, 126 of a rail vehicle 100, 102, 104 is based on the serial number (S/N) or other unique identification of the lead powered unit 108 (shown in FIG. 1) of the rail vehicle 100, 102, 104. For example, the rail vehicle 100, 102, 104 having a smaller serial number (S/N) may have a larger priority index. With respect to Trains A, B, and C in Table 1 above, Train A may have a larger priority index than Trains B and C. As a result, only Train A is permitted to switch to Channel 3. If the communication systems 106, 126 of Trains B and C then decide to switch to Channel 3, Train B may be allowed to switch to Channel 3 while Train C remains on Channel 1 because Train B has a lower serial number (S/N) and therefore, a greater priority index. Alternatively, the priority index may be based on the least significant digit of the serial numbers (S/N) of the rail vehicles 100, 102, 104. For example, the priority index of Train A may be based on "4," the priority index of Train B may be based on "5," and the priority index of Train C may be based on "6." If the priority index is greater for smaller least significant digits, then Train A may switch to Channel 3 because the priority index of Train A is larger than the priority indices of Train B and Train C. Conversely, the priority indices may be larger for larger serial numbers (S/N) or least significant digits.

As described above, the communication systems 106, 126 may dynamically update the channels being used for communication by periodically updating the distributions of the rail vehicles 100, 102, 104 among available channels (the "channel distributions") and switching between channels based on the channel distributions. The communication systems 106, 126 can dynamically update the channel distributions by updating the channel distributions several times as the rail vehicles 100, 102, 104 are moving along the tracks 114, 116, 118 (shown in FIG. 1). Repeatedly or periodically updating the channel distributions and changing which rail vehicles 100, 102, 104 use the different channels may avoid uneven distributions of rail vehicles 100, 102, 104 among the channels. For example, periodically updating the channel distributions and switching channels based thereon may prevent or reduce overcrowding or overpopulating one or more channels while one or more other channels remain underused or sparsely populated.

In one embodiment, one or more the transceiver assemblies 200, 202 may be capable of determining a location of the rail vehicle 100, 102, or 104 (shown in FIG. 1) that includes the transceiver assembly 200 or 202. For example, one or more of the antennas 122 of the transceiver assembly 200 or 202 may be a Global Positioning Satellite (GPS) antenna, a cellular antenna, or other device that determines the location of the rail vehicle 100, 102, 104. The transceiver assembly 200, 200 communicates the position to the associated monitoring module 212, 214. The monitoring module 212, 214 can use the position of the rail vehicle 100, 102, 104 to determine if one or more different channels are available for the communication systems 106, 126 as the rail vehicle 100, 102, 104 moves.

Figure 3:
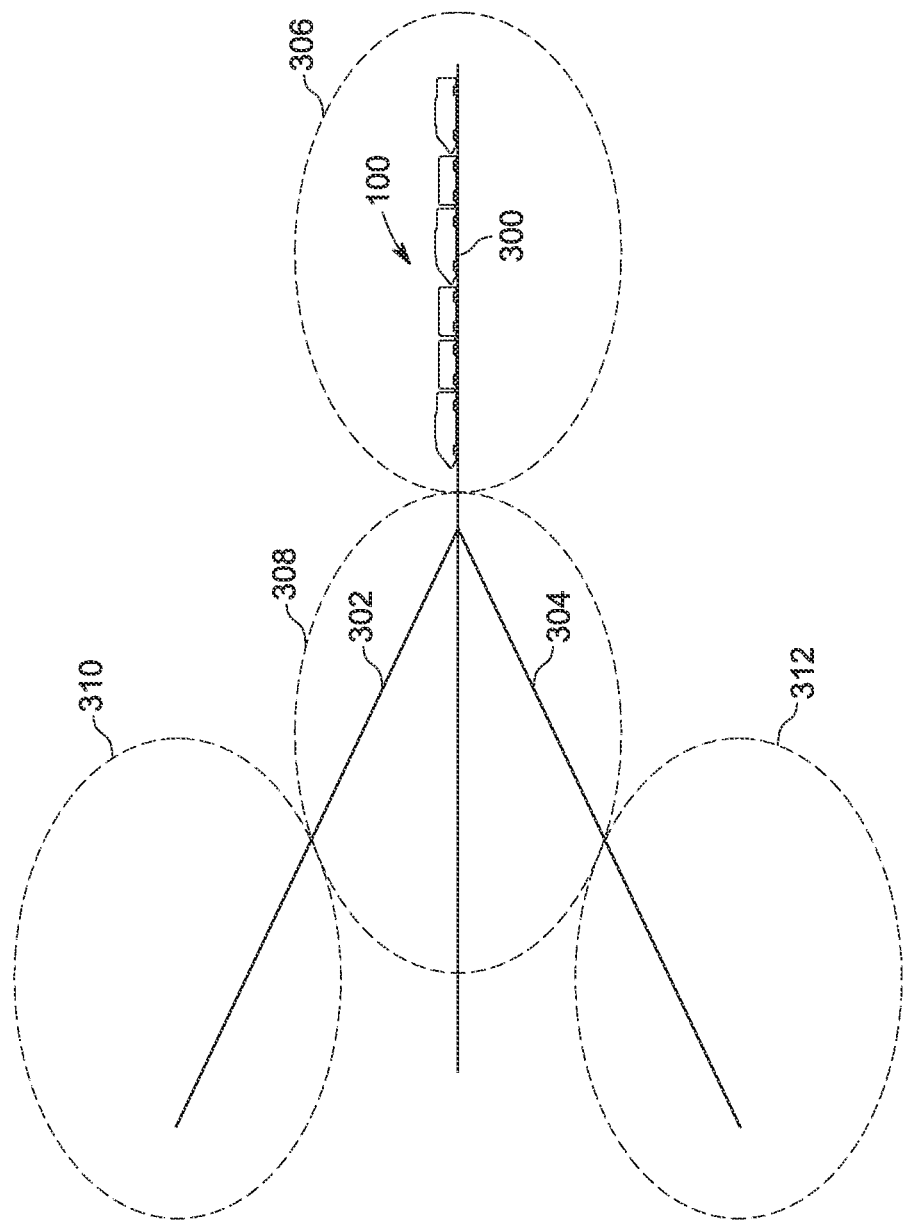
FIG. 3 illustrates one of the rail vehicles shown in FIG. 1 traveling along tracks that pass through several geographic zones in accordance with one embodiment.

With continued reference to FIG. 2, FIG. 3 illustrates the rail vehicle 100 traveling along tracks 300, 302, 304 that pass through several geographic zones 306, 308, 310, 312 in accordance with one embodiment. The track 300 extends through the zones 306 and 308, the track 302 intersects the track 300 and extends through the zones 308 and 310, and the track 304 intersects the track 300 and extends through the zones 308 and 312. The zones 306, 308, 310, 312 are non-overlapping zones in the illustrated embodiment. Alternatively, the zones 306, 308, 310, 312 may overlap each other. The zones 306, 308, 310, 312 can represent different geographic areas, such as different counties, states, groups of states, regions, countries, and the like.

The zones 306, 308, 310, 312 may have different channels available for the rail vehicle 100 to use for communication. For example, each of the zones 306, 308, 310, 312 may be assigned one or more channels that are different from the other zones 306, 308, 310, 312. The zones 306, 308, 310, 312 can be associated with different sets or groups of channels. In one embodiment, the zones 306, 308, 310, 312 have different, non-overlapping sets of channels with no adjacent zones 306, 308, 310, 312 having the same channel.

As described above, the monitoring module 212, 214 may receive the positions of the rail vehicle 100 as the rail vehicle 100 travels along one or more of the tracks 300, 302, 304. A database, listing, or table of the channels that are associated with the different zones 306, 308, 310, 312 (the "zone channel listing") may be stored on the memories 208, 210. The monitoring module 212, 214 accesses the zone channel listing for the zone 306, 308, 310 that the rail vehicle 100 is approaching (the "approaching zone"). The monitoring module 212, 214 determines load parameters for the channels of the approaching zone, such as population values for the channels of the approaching zone. For example, the monitoring modules 212, 214 may count the number of rail vehicles 100, 102, 104 and/or communication systems 106, 126 using the channels of the approaching zone.

In the illustrated embodiment, Table 3 may represent the channel distribution for the rail vehicles 100, 102, 104 traveling in the zone 306 in which the rail vehicle 100 currently is travelling (the "current zone").

TABLE 3

| Current Zone: Channel 1 | Current Zone: Channel 2 | Current Zone: Channel 3 | Current Zone: Channel 4 |
|---|---|---|---|
| Train A; S/N 1234 | Train D; S/N 4567 | | Train F; S/N 6789 |
| Train B; S/N 2345 | Train E; S/N 5678 | | |
| Train C; S/N 3456 | | | |

Table 4 illustrates an example of population values for channels of an approaching zone that may be calculated by the monitoring modules 212, 214 in one embodiment.

TABLE 4

| Approaching Zone: Channel 1 | Approaching Zone: Channel 2 | Approaching Zone: Channel 3 | Approaching Zone: Channel 4 |
|---|---|---|---|
| Train G; S/N 0123 | Train I; S/N 0345 | Train L; S/N 0678 | Train M; S/N 0789 |
| Train H; S/N 0234 | Train J; S/N 0456 | | Train N; S/N 0891 |
| | Train K; S/N 0567 | | |

For example, Table 3 may represent the channel distribution for zone 306 and Table 4 may represent the channel distribution for zone 308 as the rail vehicle 100 moves through the current zone 306 and toward the approaching zone 308. The rail vehicle 100 may be represented by Train F in Table 3. While the zones 306, 308 have the same channel numbers, namely Channels 1, 2, 3, and 4, the frequencies or frequency bands associated with the same numbered channels in the zones 306, 308 may differ. For example, the frequency or frequencies associated with Channel 1 in zone 306 may be different from the frequency or frequencies associated with Channel 1 in zone 308, the frequency or frequencies associated with Channel 2 in zone 306 may be different from the frequency or frequencies associated with Channel 2 in zone 308, the frequency or frequencies associated with Channel 3 in zone 306 may be different from the frequency or frequencies associated with Channel 3 in zone 308, and the frequency or frequencies associated with Channel 4 in zone 306 may be different from the frequency or frequencies associated with Channel 4 in zone 308. In one embodiment, the zones 306, 308 do not have any common frequencies among the respective channels of each zone 306, 308 and/or frequency bands that overlap.

Based on the channel distribution of the approaching zone 308, the selection module 204, 206 may direct the transceiver assemblies 200, 202 to switch to a selected channel of the approaching zone 308 based on the load parameters of the channels in the approaching zone 308. The selection module 204, 206 directs the transceiver assemblies 200, 202 to switch to the selected channel of the approaching zone 308 when the rail vehicle 100 enters the approaching zone 308 in one embodiment. For example, Train F may switch from using Channel 4 in zone 306 to Channel 3 in zone 308 when Train F enters the zone 308, just prior to Train F entering the zone 308, or after Train F has entered the zone 308. The rail vehicle 100 may switch to sparsely populated channels of other zones 310, 312 as the rail vehicle 100 travels along one or more of the tracks 302, 304. The rail vehicle 100 may switch between channels of the zone 308 as the rail vehicle 100 travels through the zone 308 similar to as described above.

Figure 4:
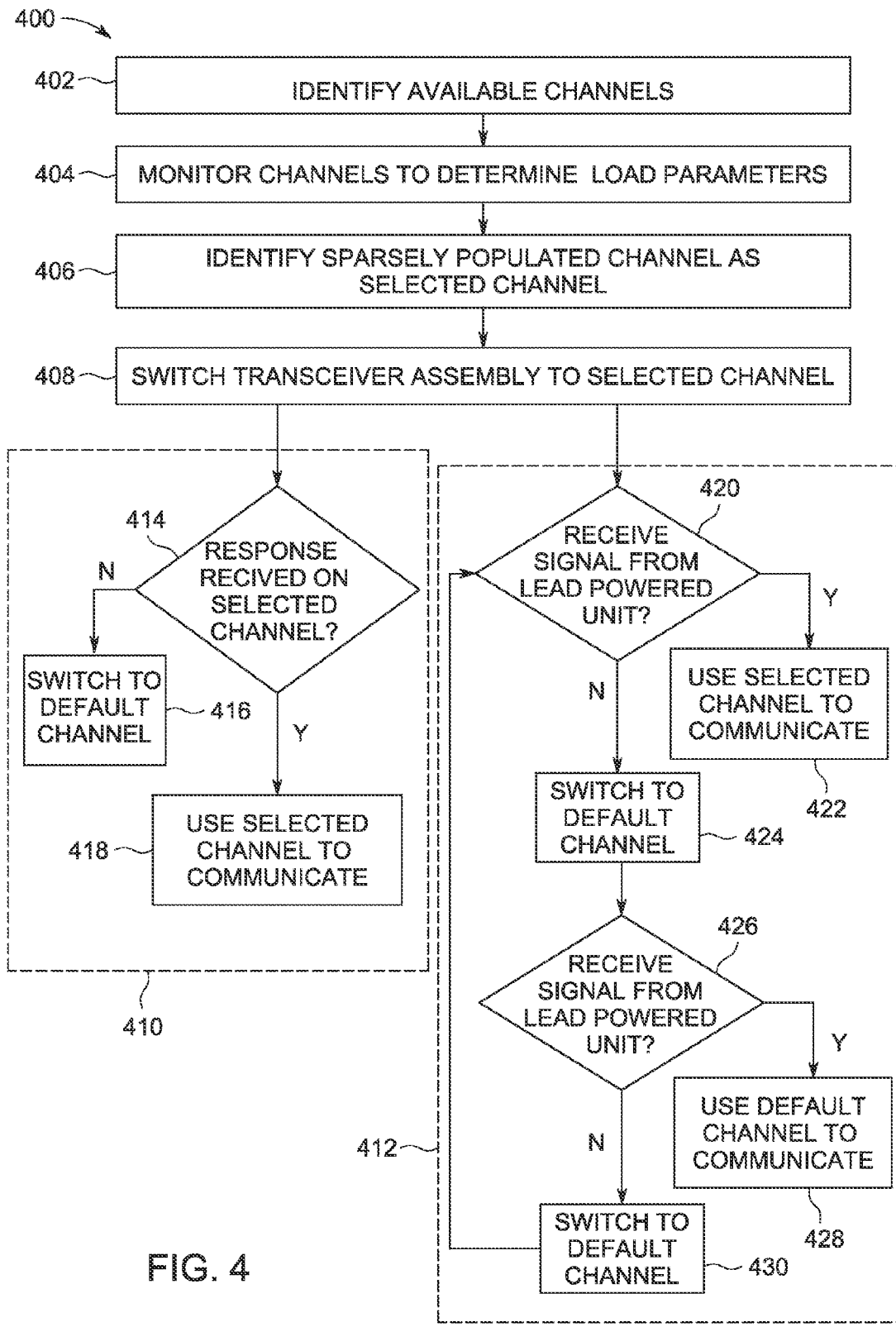
FIG. 4 is a flowchart of a method for communicating with a rail vehicle in accordance with one embodiment.

FIG. 4 is a flowchart of a method 400 for communicating with a rail vehicle in accordance with one embodiment. The method 400 may be used in conjunction with one or more of the communication systems 106, 126 (shown in FIG. 1) in order to communicate between different units of a rail vehicle, such as between lead powered units 108 and/or remote powered units 109, 110 (shown in FIG. 1). In one embodiment, the method 400 is used to select a channel for communication systems 106, 126 of the rail vehicle 100, 102, 104 (shown in FIG. 1) to use when the communication system 106, 126 is initially turned on or activated. For example, the method 400 may be used to initialize communication systems 106, 126 and couple the communication systems 106, 126 to a channel. Alternatively, the method 400 may be used after the communication systems 106, 126 are activated and communicating on a channel.

At 402, the channels that are available for communicating data signals are identified. For example, a list, table, or database in the memory 208 and/or 210 (shown in FIG. 2) may indicate which channels are available for the communication system 106 and/or 126 (shown in FIG. 1). The list of available channels may be based on the location of the rail vehicle 100, 102, 104 (shown in FIG. 1). For example, the list of channels may be based on which zone 306, 308, 310, 312 (shown in FIG. 3) that the rail vehicle 100, 102, 104 (shown in FIG. 1) having the communication systems 106, 126 is located.

At 404, the available channels monitored to determine load parameters of the channels. For example, the monitoring modules 212, 214 (shown in FIG. 2) may calculate population values for the channels and/or other channel indices, as described above.

At 406, one or more sparsely populated channels are identified based on the load parameters. For example, the selection modules 204, 206 (shown in FIG. 2) may determine which channels have relatively low population values. A channel may be a sparsely populated channel if the channel has a lower population value than one or more other channels. As described above, the load parameters may be based on other channel indices, such as QoS indices. The selection module 204, 206 may select the selected channel as a channel having a relatively low population value and/or a relatively high QoS index relative to one or more other channels.

At 408, a transceiver assembly is switched to the selected channel. For example, the transceiver assembly 200 and/or 202 (shown in FIG. 2) may be activated and switched to the selected channel. The transceiver assemblies 200, 202 may be switched from an operating channel to the selected channel by the selection modules 204, 206 (shown in FIG. 2).

Flow of the method 400 proceeds along one of a plurality of paths 410, 412 dependent on which communication system is using the method 400 to communicate. For example, if the lead communication system 106 (shown in FIG. 1) of the lead powered unit 108 (shown in FIG. 1) is employing the method 400 to select a channel, then flow of the method 400 may proceed along the path 410 to 414. If the remote communication system 126 (shown in FIG. 1) of the remote powered unit 109, 110 (shown in FIG. 1) or the non-powered unit 112 (shown in FIG. 1) is using the method 400 to select a channel, then flow of the method 400 may proceed along path 412 to 420.

Along the path 410 and at 414, the lead communication system 106 (shown in FIG. 1) transmits a data signal on the selected channel and determines if the lead communication system 106 receives a responsive data signal on the selected channel. The lead communication system 106 transmits the data signal to determine if the remote communication systems 126 (shown in FIG. 1) of the same rail vehicle 100, 102, 104 (shown in FIG. 1) are communicating on the selected channel. The data signal transmitted by the lead communication system 106 may include the serial number (S/N) or other unique identification of the lead communication system 106. The serial number (S/N) or other identification can be used by the remote communication systems 126 to verify that the remote communication systems 126 are communicating with the lead communication system 106 of the same rail vehicle 100, 102, 104. The lead communication system 106 may transmit a plurality of the data signals on the selected channel and wait a predetermined period of time after sending each data signal in order to determine if the lead and remote communication systems 106, 126 are on the same channel.

If the lead communication system 106 (shown in FIG. 1) does not receive a responsive data signal from the remote communication systems 126 (shown in FIG. 1) on the selected channel, then this absence of the responsive data signal may indicate that the lead and remote communication systems 106, 126 are not communicating on the same selected channel. As a result, flow of the method 400 proceeds to 416. Alternatively, if the lead communication system 106 does receive a responsive data signal from the remote communication systems 126 on the selected channel, then the receipt of the responsive data signal may indicate that the lead and remote communication systems 106, 126 are communicating on the same selected channel. As a result, flow of the method 400 proceeds to 418.

At 416, the lead communication system 106 (shown in FIG. 1) switches to a default channel. The lead communication system 106 may be associated with a channel that the lead communication system 106 and the remote communication systems 126 (shown in FIG. 1) switch to when the lead and remote communication systems 106, 126 are unable to communicate on one or more other channels. As the lead communication system 106 is unable to communicate with the remote communication systems 126 on the selected channel, the lead communication system 106 switches to the default channel to communicate with the remote communication systems 126.

At 418, the lead communication system 106 (shown in FIG. 1) uses the selected communication channel to communicate with the remote communication systems 126 (shown in FIG. 1). For example, as the lead and remote communication systems 106, 126 were able to successfully exchange data signals on the selected communication channel, the lead and remote communication systems 106, 126 may continue communicating on the selected channel.

Along the path 412 and at 420, the remote communication system 126 (shown in FIG. 1) determines if a data signal is received from the lead communication system 106 (shown in FIG. 1) on the selected channel. For example, the remote communication systems 126 may determine if the data signal transmitted on the selected channel at 414 of the path 410 is received by the remote communication systems 126.

If the remote communication system 126 (shown in FIG. 1) does receive a data signal from the lead communication system 106 (shown in FIG. 1) on the selected channel, then the receipt of the data signal may indicate that the lead and remote communication systems 106, 126 are communicating on the same selected channel. As a result, flow of the method 400 proceeds to 422. Alternatively, if the remote communication system 126 does not receive a data signal from the lead communication system 106 on the selected channel, then this absence of the data signal may indicate that the lead and remote communication systems 106, 126 are not communicating on the same selected channel. As a result, flow of the method 400 proceeds to 424.

At 422, the remote communication system 126 (shown in FIG. 1) communicates data signals with the lead powered unit 106 (shown in FIG. 1) on the selected channel. For example, the remote communication system 126 may receive instructions that direct operation of the remote unit propulsion subsystems 130 (shown in FIG. 1) and/or transmit data instructions providing feedback on the health or operations of the remote powered units 109, 110 (shown in FIG. 1).

At 424, the remote communication system 126 (shown in FIG. 1) switches to a default channel. As described above, the lead and remote communication systems 106, 126 (shown in FIG. 1) may be associated with a channel that the communication systems 106, 126 switch to when the communication systems 106, 126 are unable to communicate on one or more other channels. The remote communication systems 126 switch to the default channel to attempt communication with the lead communication system 106 on the default channel.

At 426, a determination is made as to whether a data signal is received on the default channel. For example, the remote communication system 126 (shown in FIG. 1) may determine if a data signal is received from the lead communication system 106 (shown in FIG. 1) on the default channel. If the data signal is received on the default channel, then receipt of the data signal indicates that the lead and remote communication systems 106, 126 are able to communicate with each other on the default channel. As a result, flow of the method 400 proceeds to 428. Alternatively, if the data signal is not received on the default channel, then the failure to receive the data signal indicates that the lead and remote communication systems 106, 126 are not able to communicate with each other on the default channel. As a result, flow of the method 400 proceeds to 430.

At 428, the remote communication system 126 (shown in FIG. 1) communicates with the lead communication system 106 (shown in FIG. 1) on the default channel. For example, the remote communication system 126 may receive instructions on the default channel that are implemented by the remote communication system 126 to control operation of the remote unit propulsion subsystem 130 (shown in FIG. 1).

At 430, the remote communication system 126 (shown in FIG. 1) switches back to the selected channel to attempt communication with the lead communication system 106 (shown in FIG. 1) again. For example, as communication on the default channel was unsuccessful, the remote communication system 126 may return to the selected channel and attempt to establish communications with the lead communication system 106 on the selected channel. Flow of the method 400 then returns to 420, where another determination is made as to whether a data signal is received from the lead communication system 106 on the selected channel. The method 400 may continue in a loop-wise manner until communication is established with the lead communication system 106 on the default or selected channel.

Figure 5:
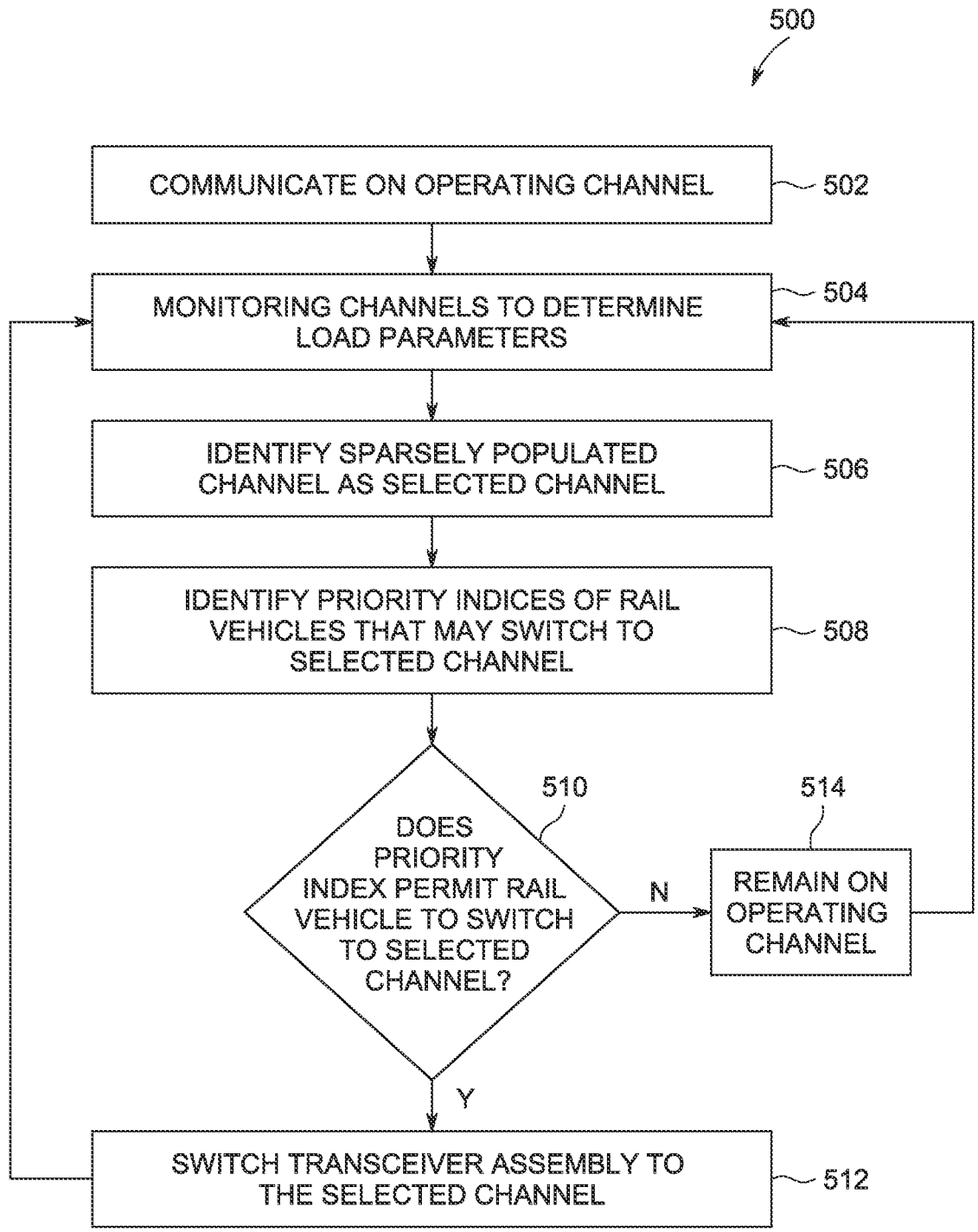
FIG. 5 is a flowchart of a method for communicating with a rail vehicle in accordance with another embodiment.

FIG. 5 is a flowchart of a method 500 for communicating with a rail vehicle in accordance with another embodiment. The method 500 may be used in conjunction with the lead and/or remote communication units 106, 126 (shown in FIG. 1) to switch which channels are used to communicate between the communication units 106, 126. For example, the method 500 may be used by the lead and/or remote communication units 106, 126 to switch from an operational channel currently being used by the communication units 106, 126 to a selected channel.

At 502, data signals are communicated on an operating channel. For example, the lead and remote communication units 106, 126 (shown in FIG. 1) currently may be communicating data signals on the operating channel, such as to remotely control operations of the remote unit propulsion subsystems 130 (shown in FIG. 1).

At 504, one or more channels monitored to determine load parameters of the channels. For example, the monitoring modules 212, 214 (shown in FIG. 2) may calculate population values for the channels and/or other channel indices, as described above.

At 506, one or more sparsely populated channels are identified based on the load parameters. For example, the selection modules 204, 206 (shown in FIG. 2) may determine which channels have relatively low population values. A channel may be a sparsely populated channel if the channel has a lower population value than one or more other channels. The load parameters may be based on other channel indices, such as QoS indices. The selection module 204, 206 may select the selected channel as a channel having a relatively low population value and/or a relatively high QoS index relative to one or more other channels.

At 508, priority indices are identified for the rail vehicles 100, 102, 104 (shown in FIG. 1) that may switch to the selected channel. For example, a first rail vehicle 100 may determine a priority index for itself and for other rail vehicles 102, 104 that are using relatively heavily populated channels. The rail vehicles 100, 102, 104 using heavily populated channels can include those rail vehicles 100, 102, 104 using channels having more rail vehicles 100, 102, 104 on the channels than the number of rail vehicles 100, 102, 104 using the selected channel. As described above, the priority indices may be based on the serial numbers (S/N) and/or other unique identifications of the lead powered units 108 (shown in FIG. 1) of the rail vehicles 100, 102, 104.

At 510, a determination is made as to whether the priority index of a first rail vehicle 100 (shown in FIG. 1) permits the rail vehicle 100 to switch to the selected channel. For example, the priority index of the rail vehicle 100 may be compared to the priority indices of other rail vehicles 102, 104 (shown in FIG. 1) to determine if the rail vehicle 100 can switch to the selected channel. As described above, if the rail vehicle 100 has a sufficiently high priority, then the communication systems 106, 126 (shown in FIG. 1) of the rail vehicle 100 may switch to the selected channel. As a result, flow of the method 500 proceeds to 512. On the other hand, if the rail vehicle 100 has too low of a priority such that other rail vehicles 102, 104 have a higher priority, then the communication systems 106, 126, 128 of the rail vehicle 100 may not switch to the selected channel. As a result, flow of the method 500 proceeds to 514. The priority index of the rail vehicle 100 may be compared to the priority indices of the rail vehicles 102, 104 using channels having load parameters that indicate the channels are at least as heavily populated as the rail vehicle 100, then the communication systems 106, 126 of the rail vehicle 100 may not switch to the selected channel. As a result, flow of the method 500 proceeds to 514. For example, the determination of which rail vehicles 100, 102, 104 have sufficiently high priority to switch channels may be made with respect to those rail vehicles 100, 102, 104 that are on relatively heavily populated channels.

At 512, the communication systems 106, 126 (shown in FIG. 1) of the rail vehicle 100, 102, 104 (shown in FIG. 1) switch to and use the selected communication channel to communicate with each other. As described above, the lead and remote powered units 108, 109, 110 (shown in FIG. 1) may use the communication systems 106, 126 to communicate over the selected channel to coordinate the tractive and/or braking efforts provided by the propulsion subsystems 120, 130 (shown in FIG. 1).

At 514, the communication systems 106, 126 (shown in FIG. 1) of the rail vehicle 100, 102, 104 (shown in FIG. 1) remain on the operating channel that was being used. For example, the communication systems 106, 126 of the rail vehicle 100, 102, 104 that was unable to switch to the selected channel due to the priority index of the rail vehicle 100, 102, 104 remain on the operating channel that was being used by the communication systems 106, 126.

Flow of the method 500 may return to 504 from 512 and/or 514 where the load parameters of the channels are again examined to determine if the communication systems 106, 126 (shown in FIG. 1) of a rail vehicle 100, 102, 104 (shown in FIG. 1) may switch to a less populated channel. The method 500 can continue in a loop-wise manner to repeatedly monitor how heavily populated various channels are and potentially switch the communication systems 106, 126 to less populated channels.

Figure 6:
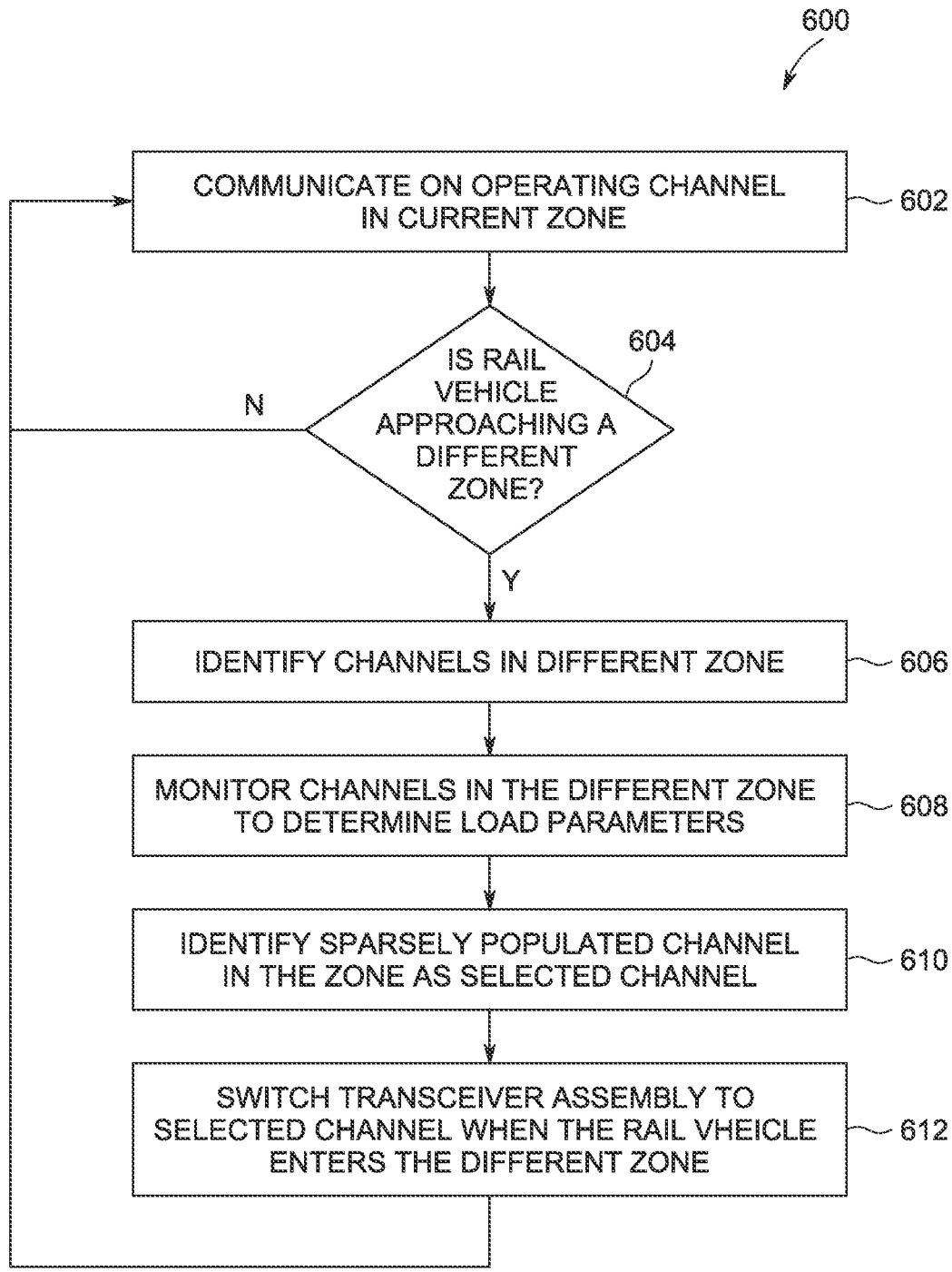
FIG. 6 is a flowchart of a method for communicating with a rail vehicle in accordance with another embodiment.

FIG. 6 is a flowchart of a method 600 for communicating with a rail vehicle in accordance with another embodiment. The method 600 may be used by a rail vehicle 100 (shown in FIG. 1) traveling between or across multiple zones 306, 308, 310, 312 (shown in FIG. 3) to switch between different channels among the zones 306, 308, 310, 312. As described above, the zones 306, 308, 310, 312 may be associated with different channels or different sets of channels.

At 602, the rail vehicle 100 (shown in FIG. 1) communicates using a current operating channel. For example, the communication systems 106, 126 (shown in FIG. 1) of the rail vehicle 100 may communicate over an operating channel while the rail vehicle 100 is in a first zone 306 (shown in FIG. 3).

At 604, a determination is made as to whether the rail vehicle 100 (shown in FIG. 1) is approaching a different zone 306, 308, 310, 312 (shown in FIG. 3) than the zone 306, 308, 310, 312 that the rail vehicle 100 currently is travelling. For example, the rail vehicle 100 may use GPS or another manner for identifying which zone 306, 308, 310, 312 the rail vehicle 100 is approaching and/or a boundary between the current zone 306, 308, 310, 312 of the rail vehicle 100 and a zone 306, 308, 310, 312 that the rail vehicle 100 is approaching. If the rail vehicle 100 is approaching a different zone 306, 308, 310, 312, then flow of the method 600 proceeds to 606. Alternatively, if the rail vehicle 100 is not approaching a different zone 306, 308, 310, 312, then flow of the method 600 returns to 602. The method 600 may proceed in a loop-wise manner until the rail vehicle 100 approaches a different zone 306, 308, 310, 312.

At 606, the channels of the approaching zone are identified. As described above, the memory 208, 210 (shown in FIG. 2) of the communication systems 106, 126 (shown in FIG. 1) may maintain a database or list of the channels that are associated with the approaching zone. Alternatively, a tower having a transceiver assembly and located in or near the approaching zone may broadcast a wireless data signal that includes a listing of the channels of the approaching zone.

At 608, the channels in the approaching zone are monitored to determine load parameters of the channels. For example, the monitoring modules 212, 214 (shown in FIG. 2) may calculate population values for the channels and/or other channel indices of the channels associated with the approaching zone, as described above.

At 610, one or more sparsely populated channels of the approaching zone are identified based on the load parameters. For example, the selection modules 204, 206 (shown in FIG. 2) may determine which channels associated with the approaching channel have relatively low population values. A channel may be a sparsely populated channel if the channel has a lower population value than one or more other channels associated with the approaching zone. As described above, the load parameters may be based on other channel indices, such as QoS indices. The selection module 204, 206 may select the selected channel as a channel having a relatively low population value and/or a relatively high QoS index relative to one or more other channels.

At 612, the rail vehicle 100 (shown in FIG. 1) switches to a selected channel of the approaching zone 306, 308, 310, 312 (shown in FIG. 3) when the rail vehicle 100 enters the approaching zone 306, 308, 310, 312. For example, the communication systems 106, 126 (shown in FIG. 1) of the rail vehicle 100 may switch to the selected channel of the approaching zone 306, 308, 310, 312 when the rail vehicle 100 enters the approaching zone 306, 308, 310, 312. Alternatively, the communication systems 106, 126 may switch to the selected channel before or shortly after entering the approaching zone 306, 308, 310, 312.

In one embodiment, the communication systems 106, 126 (shown in FIG. 1) may switch to a selected channel of the approaching zone 306, 308, 310, 312 (shown in FIG. 3) based on a priority index of the rail vehicle 100 (shown in FIG. 1), as described above.

Flow of the method 600 may return to 602, where the rail vehicle 100 (shown in FIG. 1) communicates on the selected channel as the operating channel. The method 600 may continue in a loop-wise manner to determine when the rail vehicle 100 approaches another zone 306, 308, 310, 312 (shown in FIG. 3) and to identify and/or switch to a channel of the zones 306, 308, 310, 312 as the rail vehicle 100 passes through the zones 306, 308, 310, 312.

One or more embodiments described herein provide for the ability to switch communication channels used by a DP rail vehicle in order to permit powered units of the rail vehicle to communicate over channels that are not heavily populated, or channels that are less populated with other rail vehicles. The switching between an operational channel to a selected channel by the communication systems of the rail vehicle may be performed automatically or manually, such as by an operator moving or pressing a switch, button, or other actuator. For example, in accordance with one embodiment, an operator of a rail vehicle may be provided with a display device that visually presents a table or list of available channels and the associated load parameters of the channels. The operator may then manually select which channel the communication systems of the rail vehicle will use.

It should be noted that although one or more embodiments may be described in connection with powered rail vehicle systems, the embodiments described herein are not limited to trains. In particular, one or more embodiments may be implemented in connection with different types of rail vehicles (e.g., a vehicle that travels on one or more rails, such as single locomotives and railcars, powered ore carts and other mining vehicles, light rail transit vehicles, and the like) and other vehicles. Moreover, in at least one embodiment, the terms lead powered unit and remote or trailing powered units are intended to encompass vehicles capable of self-propulsion other than locomotives. For example, while at least one embodiment describes the lead and remote or trailing powered units as being locomotives in a distributed power train, the lead and remote or trailing powered units are non-locomotive vehicles that are capable of self-propulsion in one or more other embodiments.

Example embodiments of systems and methods for switching between communication channels used by powered units in a rail vehicle to communicate with each other are provided. At least one technical effect described herein includes a method and system that allows the powered units of the rail vehicle to switch from heavily populated communication channels to less populated communication channels.

In one embodiment, a communication system for a rail vehicle includes: a transceiver assembly for selectively communicating a data signal (e.g., a "first" data signal) over a plurality of communication channels, the data signal related to distributed power operations of the rail vehicle; a selection module communicatively coupled with the transceiver assembly, the selection module capable of switching the transceiver assembly to any of the communication channels; and a monitoring module communicatively coupled with the selection module, the monitoring module configured to determine a load parameter of one or more of the communication channels, the load parameter based on a population value of the one or more communication channels, wherein the selection module switches the transceiver assembly to a selected channel of the communication channels based on the load parameter for communicating the data signal over the selected channel.

In another aspect, the monitoring module determines the load parameter based on a number of transmitting vehicles communicating data signals (e.g., the first data signal and/or second data signals) on one or more of the communication channels (e.g., all the communication channels).

In another aspect, the monitoring module determines the load parameter for each of a plurality of the communication channels based on a number of transmitting vehicles communicating data signals over each of the plurality of the communication channels.

In another aspect, the transceiver assembly is configured to be communicatively coupled with a propulsion subsystem of the rail vehicle, the transceiver assembly receiving an instruction over the selected channel with the propulsion subsystem implementing the instruction to change a tractive effort or braking effort of the rail vehicle.

In another aspect, the transceiver assembly is a lead transceiver assembly, the selection module is a lead selection module, and the monitoring module is a lead monitoring module each disposed on a lead powered unit of the rail vehicle, and further comprising a remote transceiver assembly, a remote selection module, and a remote monitoring module each disposed on a remote powered unit of the rail vehicle.

In another aspect, the lead and remote transceiver assemblies communicate the data signal on the selected channel to coordinate a tractive effort or braking effort of the lead and remote propulsion units.

In another aspect, the remote selection module switches the remote transceiver assembly between the selected channel and a default channel until the data signal is communicated between the lead and remote transceiver assemblies.

In another aspect, the monitoring module determines the load parameter of the one or more communication channels when the transceiver assembly is communicating the data signal on an operating channel and the selection module switches the transceiver assembly from the operating channel to the selected channel based on a comparison of the load parameters of the operating channel and the selected channel.

In another aspect, the selection module switches the transceiver assembly to the selected channel based on a priority index associated with the rail vehicle.

In another aspect, the monitoring module determines the load parameter for a first set of the communication channels that are available in a current geographical zone in which the rail vehicle is traveling and for a different second set of the communication channels that are available in a different geographical zone.

In another aspect, the selection module switches the transceiver assembly to the selected channel in the second set of the communication channels when the rail vehicle enters the different geographical zone.

In another embodiment, a method for communicating with a rail vehicle includes: monitoring a population value of one or more communication channels used by a transceiver assembly of the rail vehicle to communicate a data signal related to distributed power operations of the rail vehicle; determining a load parameter of the one or more communication channels based on the population value; and switching the transceiver assembly to a selected channel of the communication channels based on the load parameter.

In another aspect, the monitoring step includes identifying a number of transmitting vehicles that are communicating data signals over the one or more communication channels.

In another aspect, the method further includes communicating the data signal on the selected channel to change a tractive effort or braking effort of the rail vehicle.

In another aspect, the transceiver assembly is a lead transceiver assembly of a lead powered unit of the rail vehicle and the switching step includes switching the lead transceiver assembly and a remote transceiver assembly of a remote powered unit of the rail vehicle to the selected channel.

In another aspect, the method further includes communicating the data signal on the selected channel to coordinate a tractive effort or braking effort of the lead and remote powered units.

In another aspect, the switching step includes switching the remote transceiver assembly of the remote powered unit between the selected channel and a default channel until the data signal is communicated between the lead and remote transceiver assemblies.

In another aspect, the switching step includes switching the transceiver assembly to the selected channel based on a priority index associated with the rail vehicle.

In another aspect, the monitoring step includes monitoring the population value for a first set of the communication channels that are available in a current geographical zone in which the rail vehicle is traveling and for a different second set of the communication channels that are available in a different geographical zone.

In another aspect, the switching step includes switching the transceiver assembly to the selected channel in the second set of the communication channels when the rail vehicle enters the different geographical zone.

In another embodiment, a non-transitory computer readable storage medium for a rail vehicle having a transceiver assembly, a selection module, and a monitoring module is provided. The computer readable storage medium includes instructions to: direct the monitoring module to determine a load parameter of one or more communication channels over which the transceiver assembly communicates a data signal related to distributed power operations of the rail vehicle, the load parameter based on a population value of the one or more communication channels; and direct the selection module to switch the transceiver assembly to a selected channel of the communication channels based on the load parameter.

In another aspect, the instructions direct the monitoring module to determine the load parameter based on a number of transmitting vehicles communicating data signals on the one or more communication channels.

In another aspect, the instructions direct the monitoring module to determine the load parameter for each of a plurality of the communication channels based on a number of transmitting vehicles communicating data signals over each of the plurality of the communication channels.

In another aspect, the instructions direct the transceiver assembly to receive an instruction over the selected channel and communicate the instruction to a propulsion subsystem of the rail vehicle to change a tractive effort or braking effort of the rail vehicle.

In another aspect, the transceiver assembly is a lead transceiver assembly of a lead propulsion unit of the rail vehicle, and the instructions direct the transceiver assembly to communicate the data signal on the selected channel with a remote transceiver assembly of a remote propulsion unit of the rail vehicle to coordinate a tractive effort or braking effort of the lead and remote propulsion units.

In another aspect, the instructions direct the selection module to switch the transceiver assembly between the selected channel and a default channel until the data signal is communicated with a different transceiver assembly.

In another aspect, the instructions direct the monitoring module to determine the load parameter of the one or more communication channels when the transceiver assembly is communicating the data signal on an operating channel, and the instructions direct the selection module to switch the transceiver assembly from the operating channel to the selected channel based on a comparison of the load parameters of the operating channel and the selected channel.

In another aspect, the instructions direct the selection module to switch the transceiver assembly to the selected channel based on a priority index associated with the rail vehicle.

In another aspect, the instructions direct the monitoring module to determine the load parameter for a first set of the communication channels that are available in a current geographical zone in which the rail vehicle is traveling and for a different second set of the communication channels that are available in a different geographical zone.

In another aspect, the instructions direct the selection module to switch the transceiver assembly to the selected channel in the second set of the communication channels when the rail vehicle enters the different geographical zone.

In an embodiment, a communication system for a rail vehicle comprises a transceiver assembly for selectively communicating a data signal over a plurality of communication channels. "Selectively" communicating means selecting one of the communication channels for communication of the data signal over that channel, or selecting two or more of the channels for communication of the data signal over the two or more channels, with any of the channels being potential candidates for data signal communication.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosed subject matter without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the described subject matter, including the best mode, and also to enable any person of ordinary skill in the art to practice the embodiments disclosed herein, including making and using any devices or systems and performing any incorporated methods. The patentable scope of the subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, embodiments "comprising," "including," or "having" an element or a plurality of elements having a particular property may include additional such elements not having that property unless explicitly stated to the contrary.

What is claimed is:

1. A communication system for a vehicle, the system comprising:
a transceiver assembly configured to communicate a data signal over a plurality of communication channels; and
one or more processors configured to switch the transceiver assembly to communicate over one or more of the communication channels, the one or more processors also configured to, while the vehicle is traveling in a first geographic zone, determine load parameters of communication channels available for communication in a different, second geographic zone that the vehicle is traveling toward but has not yet reached, the load parameters based on population values of the communication channels in the different, second geographic zone, wherein the one or more processors also are configured to select a selected channel of the communication channels available for communication in the different, second geographic zone based on the load parameter and to switch the transceiver assembly to the selected channel responsive to the vehicle traveling in the different, second geographic zone, wherein the transceiver assembly is configured to communicate the data signal of the plurality of communication channels between the vehicle and one or more other vehicles of a vehicle consist.

2. The communication system of claim 1, wherein the one or more processors are configured to determine the load parameters for the communication channels available for communication in the different, second geographic zone based on how many transmitting vehicles are communicating data signals using the communication channels in the different, second geographic zone.

3. The communication system of claim 1, wherein the transceiver assembly is configured to be communicatively coupled with a propulsion subsystem of the vehicle, the transceiver assembly configured to receive an instruction over the selected channel with the propulsion subsystem implementing the instruction to change a tractive effort or braking effort of the vehicle.

4. The communication system of claim 1, wherein the transceiver assembly is a lead transceiver assembly, and further comprising a remote transceiver assembly disposed on a remote propulsion unit of the vehicle.

5. The communication system of claim 4, wherein the remote transceiver assembly is configured to be switched between the selected channel and a default channel until the data signal is communicated between the lead and remote transceiver assemblies.

6. The communication system of claim 1, wherein the one or more processors are configured to switch the transceiver assembly to the selected channel based on a priority index associated with the vehicle.

7. The communication system of claim 1, wherein the one or more processors are configured to switch the transceiver assembly to the selected channel responsive to the vehicle entering the different, second geographic zone.

8. A communication system comprising:
one or more processors configured to be disposed onboard a vehicle during travel of the vehicle in a current geographic zone, the one or more processors also configured to determine load parameters of different communication channels available for communication in a different, approaching geographic zone that the vehicle is traveling toward while the vehicle is in the current geographic zone, wherein the one or more processors also are configured to switch a transceiver assembly disposed onboard the vehicle to a selected channel of the different communication channels based on the load parameters responsive to the vehicle reaching the different, approaching geographic zone, wherein said communication channels are used for communication between the vehicle and one or more other vehicles of a vehicle consist.

9. The communication system of claim 1, wherein the one or more processors are configured to determine the load parameters for the communication channels that are available in the different, second geographic zone prior to the vehicle reaching or entering the different, second geographic zone.

10. The communication system of claim 1, wherein the one or more processors are configured to determine the load parameters for the communication channels that are available for communication by the vehicle in the different, second geographic zone but that are not available for communication by the vehicle in the first geographic zone.

11. The communication system of claim 1, wherein the one or more processors also are configured to determine the load parameters for communication channels available for communication in the first geographic zone while the vehicle is in the first geographic zone and to switch the transceiver assembly between the communication channels available for communication in the first geographic zone based on the load parameters for the communication channels available for communication in the first geographic zone.

12. A method for communicating with a vehicle, the method comprising:
monitoring, with one or more processors while the vehicle is in a first geographic zone, population values of communication channels available for communication in a different, second geographic zone that the vehicle is traveling toward;
determining, with the one or more processors, load parameters of the communication channels available for communication in the different, second geographic zone based on the population values; and
switching, with the one or more processors, the transceiver assembly of the vehicle to a selected channel of the communication channels based on the load parameters responsive to the vehicle in the different, second geographic zone, wherein the communication channels are used by the vehicle and one or more other vehicles of a vehicle consist for communicating in the vehicle consist.

13. The method of claim 12, wherein the monitoring step includes identifying a number of transmitting vehicles that are communicating data signals over the communication channels in the different, second geographic zone that the vehicle is traveling toward.

14. The method of claim 12, wherein the transceiver assembly is a lead transceiver assembly of a lead propulsion unit of the vehicle and the switching step includes switching the lead transceiver assembly and a remote transceiver assembly of a remote propulsion unit of the vehicle to the selected channel.

15. The method of claim 14, wherein the switching step includes switching the remote transceiver assembly of the remote propulsion unit between the selected channel and a default channel until the data signal is communicated between the lead and remote transceiver assemblies.

16. The method of claim 14, wherein the switching step includes switching the transceiver assembly to the selected channel based on a priority index associated with the vehicle.

17. The method of claim 12, wherein the switching step includes switching the transceiver assembly to the selected channel responsive to the vehicle entering the different, second geographic zone.

18. The communication system of claim 8, wherein the one or more processors are configured to switch the transceiver assembly between the selected channel and a default channel until the data signal is communicated with a different transceiver assembly.

19. The communication system of claim 8, wherein the one or more processors are configured to switch the transceiver assembly to the selected channel based on a priority index associated with the vehicle.

20. The communication system of claim 8, wherein the one or more processors are configured to determine the load parameters based on how many transmitting vehicles are communicating data signals on the different communication channels in the different, approaching geographic zone.

* * * * *